United States Patent
Sundararajan et al.

(10) Patent No.: US 10,708,016 B2
(45) Date of Patent: Jul. 7, 2020

(54) REFERENCE SIGNALS FOR ESTIMATING MIXED INTERFERENCE

(71) Applicant: QUALCOMM Incorporated, San Diego, CA (US)

(72) Inventors: Jay Kumar Sundararajan, San Diego, CA (US); Naga Bhushan, San Diego, CA (US); Tingfang Ji, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 63 days.

(21) Appl. No.: 15/176,347

(22) Filed: Jun. 8, 2016

(65) Prior Publication Data

US 2017/0170936 A1   Jun. 15, 2017

Related U.S. Application Data

(60) Provisional application No. 62/267,189, filed on Dec. 14, 2015.

(51) Int. Cl.
*H04L 5/00* (2006.01)
*H04W 76/27* (2018.01)
(Continued)

(52) U.S. Cl.
CPC ........... *H04L 5/0048* (2013.01); *H04W 24/08* (2013.01); *H04W 28/0236* (2013.01);
(Continued)

(58) Field of Classification Search
CPC ..... H04L 5/007; H04L 5/0035; H04L 5/0048; H04L 5/1469; H04W 24/08; H04W 28/0236; H04W 72/0446; H04W 76/046
See application file for complete search history.

(56) References Cited

U.S. PATENT DOCUMENTS

2012/0327800 A1* 12/2012 Kim ................... H04W 72/082
                                                        370/252
2012/0329498 A1* 12/2012 Koo ...................... H04J 11/005
                                                        455/501
(Continued)

FOREIGN PATENT DOCUMENTS

WO    WO-2015048277 A1    4/2015

OTHER PUBLICATIONS

Intel Corporation: "Discussion on inter-cell Measurements for LTE-TDD eIMTA," 3GPP Draft; R1-131471—Intel—Discussion On Enb-Enb Measurements, 3rd Generation Partnership Project (3GPP), Mobile Competence Centre ; 650, Route Des Lucioles ; F-06921 Sophia-Antipolis Cedex ; FRA vol. RAN WG1, No. Chicago, USA; Apr. 15, 2013-Apr. 19, 2013 Apr. 6, 2013 (Apr. 6, 2013), XP050697281, Retrieved from the Internet: URL:http://www.3gpp.org/ftp/tsg_ran/WG1_RL1/TSGR1_72b/Docs/ [retrieved on Apr. 6, 2013], 5 pages.
(Continued)

*Primary Examiner* — Khaled M Kassim
(74) *Attorney, Agent, or Firm* — Patterson + Sheridan, LLP/Qualcomm Incorporated

(57) ABSTRACT

Aspects of the present disclosure provide an apparatus and techniques for wireless communication. A node (e.g., a BS or UE) may receive information regarding a configuration of at least one subframe for measuring mixed interference between the node and one or more nodes in a network. The configuration specifies a pattern for measuring reference signals by the node within the at least one subframe. The node may measure reference signals according to the pattern, and determine interference between the node and the one or more nodes, based on the measured reference signals.

26 Claims, 16 Drawing Sheets

(51) Int. Cl.
  H04W 24/08    (2009.01)
  H04W 28/02    (2009.01)
  H04W 72/04    (2009.01)
  H04L 5/14     (2006.01)

(52) U.S. Cl.
  CPC ....... H04W 72/0446 (2013.01); H04W 76/27 (2018.02); *H04L 5/0007* (2013.01); *H04L 5/0035* (2013.01); *H04L 5/1469* (2013.01)

(56) References Cited

U.S. PATENT DOCUMENTS

| | | | | |
|---|---|---|---|---|
| 2014/0036714 | A1* | 2/2014 | Teng | H04W 24/02 370/252 |
| 2014/0038613 | A1* | 2/2014 | Toskala | H04W 36/20 455/436 |
| 2014/0198678 | A1* | 7/2014 | Kim | H04W 24/06 370/252 |
| 2014/0286293 | A1 | 9/2014 | Jang et al. | |
| 2014/0307576 | A1* | 10/2014 | Nagata | H04L 1/0001 370/252 |
| 2014/0307577 | A1* | 10/2014 | Benjebbour | H04W 52/243 370/252 |
| 2014/0321313 | A1* | 10/2014 | Seo | H04J 11/00 370/252 |
| 2015/0189574 | A1 | 7/2015 | Ng et al. | |
| 2015/0229452 | A1* | 8/2015 | Nagata | H04L 5/0051 370/252 |
| 2015/0256307 | A1* | 9/2015 | Nagata | H04L 5/0051 370/328 |
| 2015/0264592 | A1 | 9/2015 | Novlan et al. | |
| 2015/0312784 | A1 | 10/2015 | You et al. | |
| 2016/0037541 | A1* | 2/2016 | Kim | H04W 72/085 370/329 |
| 2016/0044729 | A1* | 2/2016 | Tu | H04W 74/04 370/329 |
| 2016/0088617 | A1* | 3/2016 | Goldhamer | H04L 1/18 370/330 |
| 2016/0182198 | A1* | 6/2016 | Won | H04L 5/0035 370/329 |
| 2016/0262114 | A1* | 9/2016 | Chen | H04W 52/143 |
| 2016/0359597 | A1* | 12/2016 | Seo | H04W 72/082 |
| 2017/0164375 | A1* | 6/2017 | Sundararajan | H04W 72/082 |

OTHER PUBLICATIONS

International Search Report and Written Opinion—PCT/US2016/064214—ISA/EPO—Mar. 27, 2017.
New Postcom: "Considerations on issues of interference mitigation schemes," 3GPP Draft; R1-132199 Considerations on Issues of Interference Mitigation Schemes, 3rd Generation Partnership Project (3GPP), Mobile Competence Centre ; 658, Route Des Lucioles, F-86921 Sophia-Antipolis vol. Ran WG1. No. Fukuoka. Japan; May 20, 2013-May 24, 2013 May 11, 2013 (May 11, 2013). XP050697971, Retrieved from the Internet: URL:http://www.3gpp.org/ftp/tsg_ran/WG1_RL1/TSGR1 73/DOCS/[retrieved on May 11, 2013], 4 pages.
Qualcomm Incorporated: "Interference Mitigation Schemes for eIMTA," 3GPP Draft; R1-133578 Interference Mitigation Schemes For EIMTA, 3rd Generation Partnership Project (3GPP), Mobile Competence Centre ; 650, Route Des Lucioles ; F-06921 Sophia-Antipolis Cedex ; France vol. RAN WG1, No. Barcelona, Spain; Aug. 19, 2013-Aug. 23, 2013 Aug. 10, 2013 (Aug. 10, 2013), XP050716670 Retrieved from the Internet: URL:http://www.3gpp.org/ftp/tsg_ran/WG1_RL1/TSGR1_74/Docs/ [retrieved on Aug. 10, 2013], 5 pages.

\* cited by examiner

FIG. 14

REFERENCE SIGNALS FOR ESTIMATING MIXED INTERFERENCE

CROSS-REFERENCE TO RELATED APPLICATION(S)

This application claims the benefit of U.S. Provisional Application Ser. No. 62/267,189, entitled, "REFERENCE SIGNALS FOR ESTIMATING MIXED INTERFERENCE," filed Dec. 14, 2015, assigned to the assignee hereof and hereby expressly incorporated by reference herein.

BACKGROUND

I. Field of the Disclosure

The present disclosure generally relates to wireless communication and, more particularly, to methods and apparatus for estimating mixed interference profiles between nodes in a network.

II. Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

Some wireless communication systems, such as LTE, may have a fixed downlink and uplink subframe configuration. Accordingly, at a given point in time, cells in the network may be synchronized. It may be desirable for cells to reconfigure the ratio of downlink to uplink subframes in an effort to efficiently manage demands of the network.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Techniques and apparatus are provided herein for estimating mixed interference profiles between nodes in a network.

Certain aspects of the present disclosure provide a method for wireless communication by a user equipment (UE). The method generally includes receiving information regarding a configuration of at least one subframe for measuring mixed interference between the UE and one or more nodes in a network. The configuration specifies a pattern for measuring reference signals by the UE within the at least one subframe. The method also includes measuring reference signals according to the pattern. The method further includes determining interference between the UE and the one or more nodes, based on the measured reference signals.

Certain aspects of the present disclosure provide a method for wireless communication by a base station (BS). The method generally includes receiving information regarding a configuration of at least one subframe for measuring mixed interference between the BS and one or more nodes in a network. The configuration specifies a pattern for measuring reference signals by the BS within the at least one subframe. The method also includes measuring reference signals according to the pattern. The method further includes determining interference between the BS and the one or more nodes, based on the measured reference signals.

Certain aspects of the present disclosure provide an apparatus for wireless communication by a UE. The apparatus generally includes means for receiving information regarding a configuration of at least one subframe for measuring mixed interference between the UE and one or more nodes in a network. The configuration specifies a pattern for measuring reference signals by the UE within the at least one subframe. The apparatus also includes means for measuring reference signals according to the pattern. The apparatus further includes means for determining interference between the UE and the one or more nodes, based on the measured reference signals.

Certain aspects of the present disclosure provide an apparatus for wireless communication by a BS. The apparatus generally includes means for receiving information regarding a configuration of at least one subframe for measuring mixed interference between the BS and one or more nodes in a network. The configuration specifies a pattern for measuring reference signals by the BS within the at least one subframe. The apparatus also includes means for measuring reference signals according to the pattern. The apparatus further includes means for determining interference between the BS and the one or more nodes, based on the measured reference signals.

Certain aspects of the present disclosure provide an apparatus for wireless communication by a UE. The apparatus generally includes at least one processor and a memory coupled to the at least one processor. The at least one processor is configured to receive information regarding a configuration of at least one subframe for measuring mixed interference between the UE and one or more nodes in a network. The configuration specifies a pattern for measuring reference signals by the UE within the at least one subframe. The at least one processor is also configured to measure reference signals according to the pattern. The at least one processor is further configured to determine interference between the UE and the one or more nodes, based on the measured reference signals.

Certain aspects of the present disclosure provide an apparatus for wireless communication by a BS. The apparatus generally includes at least one processor and a memory coupled to the at least one processor. The at least one processor is configured to receive information regarding a configuration of at least one subframe for measuring mixed interference between the BS and one or more nodes in a network. The configuration specifies a pattern for measuring reference signals by the BS within the at least one subframe. The at least one processor is also configured to measure reference signals according to the pattern. The at least one processor is further configured to determine interference between the BS and the one or more nodes, based on the measured reference signals.

Certain aspects of the present disclosure provide a computer-readable medium having computer executable code stored thereon. The computer executable code generally includes code for receiving, by a UE, information regarding a configuration of at least one subframe for measuring mixed interference between the UE and one or more nodes in a network. The configuration specifies a pattern for measuring reference signals by the UE within the at least one subframe. The computer executable code also includes code for measuring, by the UE, reference signals according to the pattern, and code for determining, by the UE, interference between the UE and the one or more nodes, based on the measured reference signals.

Certain aspects of the present disclosure provide a computer-readable medium having computer executable code stored thereon. The computer executable code generally includes code for receiving, by a BS, information regarding a configuration of at least one subframe for measuring mixed interference between the BS and one or more nodes in a network. The configuration specifies a pattern for measuring reference signals by the BS within the at least one subframe. The computer executable code also includes code for measuring, by the BS, reference signals according to the pattern, and code for determining, by the BS, interference between the BS and the one or more nodes, based on the measured reference signals.

Numerous other aspects are provided including methods, apparatus, systems, computer program products, and processing systems. To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical assets of this disclosure and are therefore not to be considered limiting of its scope, for the description may admit to other equally effective aspects.

FIG. 14 illustrates an example transmission/reception pattern for UEs in a UL-centric mixed interference measurement subframe, in accordance with certain aspects of the present disclosure.

DETAILED DESCRIPTION

Figure 1:
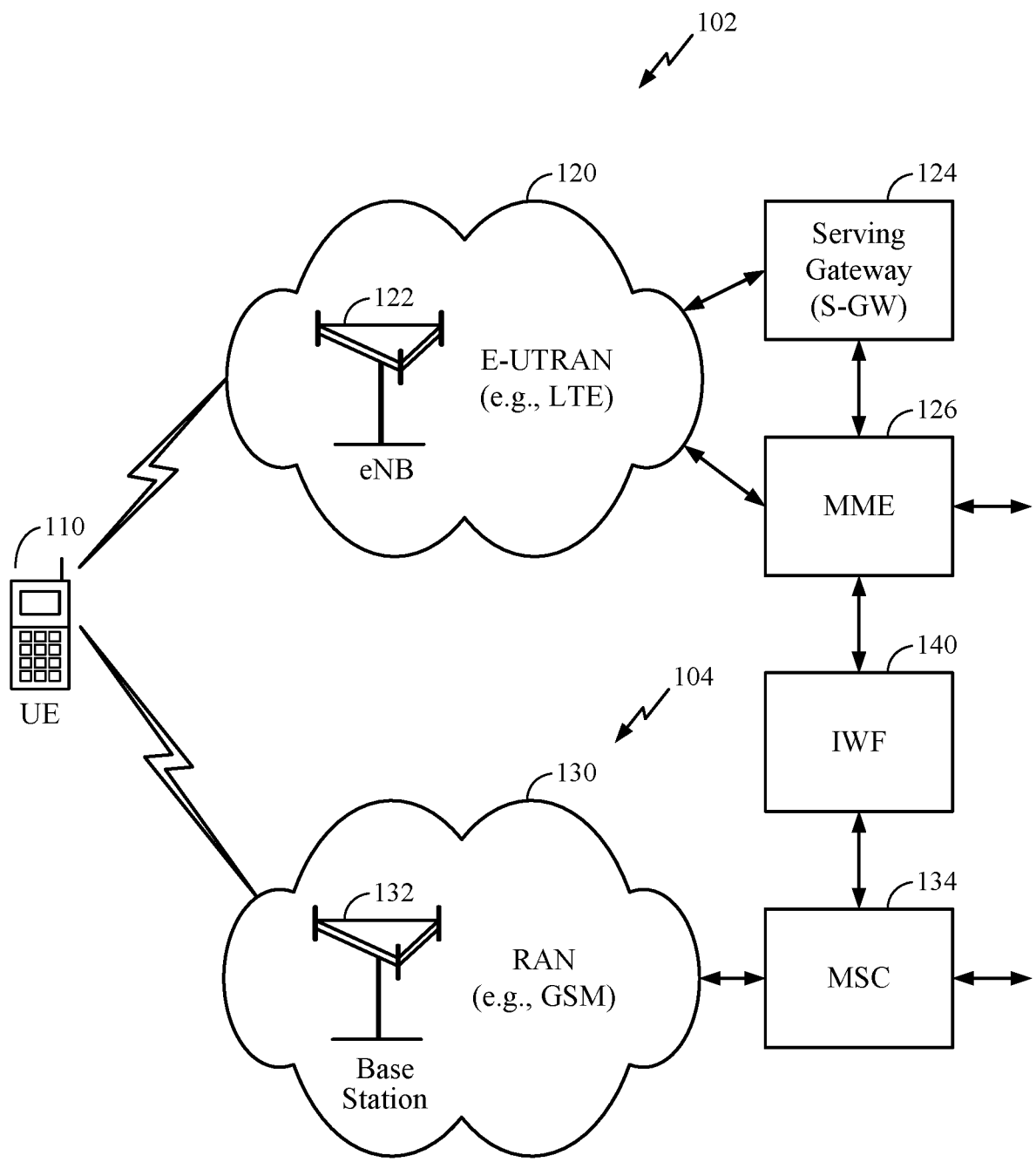
FIG. 1 illustrates an exemplary deployment in which multiple wireless networks have overlapping coverage, in accordance with certain aspects of the present disclosure.

Aspects of the present disclosure provide techniques and apparatus (e.g., UE, BS, etc.) for measuring mixed (e.g., DL-to-UL or UL-to-DL) interference between different pairs of nodes (e.g., BS-to-BS, UE-to-UE, etc.) in a network. As described in more detail below, the techniques presented herein provide a frame structure that includes one more subframes for measuring the mixed interference between the different pairs of nodes in the network. For example, nodes in the network may use such mixed interference measurement subframes intermittently in between other subframes (e.g., such as data subframes) in order to estimate mixed interference. Based on the measurements performed during the measurement subframes, the nodes in the network may determine an amount of interference present between different pairs of nodes, compute (or update) jamming graphs, determine whether to switch an uplink subframe to a downlink subframe, or vice versa, etc.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software/firmware, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software/firmware, middleware, microcode, hardware description language, or otherwise.

Accordingly, in one or more exemplary embodiments, the functions described may be implemented in hardware, software/firmware, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The techniques described herein may be used for various wireless communication networks such as code division multiple access (CDMA), time division multiple access (TDMA), frequency division multiple access (FDMA), orthogonal FDMA (OFDMA), single carrier FDMA (SC-FDMA) and other networks. The terms "network" and "system" are often used interchangeably. A CDMA network may implement a radio access technology (RAT) such as universal terrestrial radio access (UTRA), cdma2000, etc. UTRA includes wideband CDMA (WCDMA) and other variants of CDMA. cdma2000 covers IS-2000, IS-95 and IS-856 standards. IS-2000 is also referred to as 1x radio transmission technology (1xRTT), CDMA2000 1x, etc. A TDMA network may implement a RAT such as global system for mobile communications (GSM), enhanced data rates for GSM evolution (EDGE), or GSM/EDGE radio access network (GERAN). An OFDMA network may implement a RAT such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP long-term evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and RATs mentioned above as well as other wireless networks and RATs.

It is noted that while aspects may be described herein using terminology commonly associated with 3G and/or 4G wireless technologies, aspects of the present disclosure can be applied in other generation-based communication systems, such as 5G and later.

FIG. 1 illustrates an example deployment in which aspects of the present disclosure may be implemented. For example, a BS such, for example, as BS 122 or BS 132 may receive information regarding a configuration of at least one subframe for measuring mixed interference between the BS and one or more nodes (e.g., other BSs, UEs, etc.) in their respective network(s). Similarly, a UE such, for example, as UE 110 may receive information regarding a configuration of at least one subframe for measuring mixed interference between the UE and one or more nodes (e.g., other UEs, BSs, etc.) in their respective network(s). Such configuration information may specify a pattern of occurrence of the mixed interference measurement subframe(s), the structure of the mixed interference measurement subframe(s) (e.g., referring to the configuration of the transmission and reception pattern for each of the nodes within the measurement subframe), etc. Once received, the BS and/or UE may transmit and/or receive reference signals within the measurement subframes according to pattern(s) specified within the configuration information. The BS and/or UE may then determine interference between pairs of nodes in the network(s), based on the reference signals.

FIG. 1 shows an exemplary deployment in which multiple wireless networks have overlapping coverage. A radio access network such as an evolved universal terrestrial radio access network (E-UTRAN) 120 may support LTE and may include a number of evolved Node Bs (eNBs) 122 and other network entities that can support wireless communication for user equipments 110 (UEs). An eNB is an entity that communicates with UEs and may also be referred to as a base station, a Node B, or an access point (AP). Each eNB 122 may provide communication coverage for a particular geographic area. The term "cell" can refer to a coverage area of an eNB and/or an eNB subsystem serving this coverage area. A serving gateway (S-GW) 124 may communicate with E-UTRAN 120 and may perform various functions such as packet routing and forwarding, mobility anchoring, packet buffering, initiation of network-triggered services, etc. A mobility management entity (MME) 126 may communicate with E-UTRAN 120 and serving gateway 124 and may perform various functions such as mobility management, bearer management, distribution of paging messages, security control, authentication, gateway selection, etc. The network entities in LTE are described in 3GPP TS 36.300, entitled "Evolved Universal Terrestrial Radio Access (E-UTRA) and Evolved Universal Terrestrial Radio Access Network (E-UTRAN); Overall description," which is publicly available.

A radio access network (RAN) 130 may support GSM and may include a number of base stations (BSs) 132 and other network entities that can support wireless communication for UEs. A mobile switching center (MSC) 134 may communicate with the RAN 130 and may support voice services, provide routing for circuit-switched calls, and perform mobility management for UEs located within the area served by MSC 134. Optionally, an inter-working function (IWF) 140 may facilitate communication between MME 126 and MSC 134 (e.g., for 1xCSFB).

E-UTRAN 120, serving gateway 124, and MME 126 may be part of an LTE network 102. RAN 130 and MSC 134 may be part of a GSM network 104. For simplicity, FIG. 1 shows only some network entities in the LTE network 102 and the GSM network 104. The LTE and GSM networks may also include other network entities that may support various functions and services.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs.

A UE 110 may be stationary or mobile and may also be referred to as a mobile station, a terminal, an access terminal, a subscriber unit, a station, etc. UE 110 may be a cellular phone, a personal digital assistant (PDA), a wireless modem, a wireless communication device, a handheld device, a laptop computer, a cordless phone, a wireless local loop (WLL) station, etc. In aspects, UE 110 may be a Dual SIM dual standby (DSDS) UE.

Upon power up, UE 110 may search for wireless networks from which it can receive communication services. If more than one wireless network is detected, then a wireless network with the highest priority may be selected to serve UE 110 and may be referred to as the serving network. UE 110 may perform registration with the serving network, if necessary. UE 110 may then operate in a connected mode to actively communicate with the serving network. Alternatively, UE 110 may operate in an idle mode and camp on the serving network if active communication is not required by UE 110.

UE 110 may be located within the coverage of cells of multiple frequencies and/or multiple RATs while in the idle mode. For LTE, UE 110 may select a frequency and a RAT to camp on based on a priority list. This priority list may include a set of frequencies, a RAT associated with each frequency, and a priority of each frequency. For example, the priority list may include three frequencies X, Y and Z. Frequency X may be used for LTE and may have the highest priority, frequency Y may be used for GSM and may have the lowest priority, and frequency Z may also be used for GSM and may have medium priority. In general, the priority list may include any number of frequencies for any set of RATs and may be specific for the UE location. UE 110 may be configured to prefer LTE, when available, by defining the priority list with LTE frequencies at the highest priority and with frequencies for other RATs at lower priorities, e.g., as given by the example above.

UE 110 may operate in the idle mode as follows. UE 110 may identify all frequencies/RATs on which it is able to find a "suitable" cell in a normal scenario or an "acceptable" cell in an emergency scenario, where "suitable" and "acceptable" are specified in the LTE standards. UE 110 may then camp on the frequency/RAT with the highest priority among all identified frequencies/RATs. UE 110 may remain camped on this frequency/RAT until either (i) the frequency/RAT is no longer available at a predetermined threshold or (ii) another frequency/RAT with a higher priority reaches this threshold. This operating behavior for UE 110 in the idle mode is described in 3GPP TS 36.304, entitled "Evolved Universal Terrestrial Radio Access (E-UTRA); User Equipment (UE) procedures in idle mode," which is publicly available.

UE 110 may be able to receive packet-switched (PS) data services from LTE network 102 and may camp on the LTE network while in the idle mode. LTE network 102 may have limited or no support for voice-over-Internet protocol (VoIP), which may often be the case for early deployments of LTE networks. Due to the limited VoIP support, UE 110 may be transferred to another wireless network of another RAT for voice calls. This transfer may be referred to as circuit-switched (CS) fallback. UE 110 may be transferred to a RAT that can support voice service such as 1xRTT, WCDMA, GSM, etc. For call origination with CS fallback, UE 110 may initially become connected to a wireless network of a source RAT (e.g., LTE) that may not support voice service. The UE may originate a voice call with this wireless network and may be transferred through higher-layer signaling to another wireless network of a target RAT that can support the voice call. The higher-layer signaling to transfer the UE to the target RAT may be for various procedures, e.g., connection release with redirection, PS handover, etc.

Figure 2:
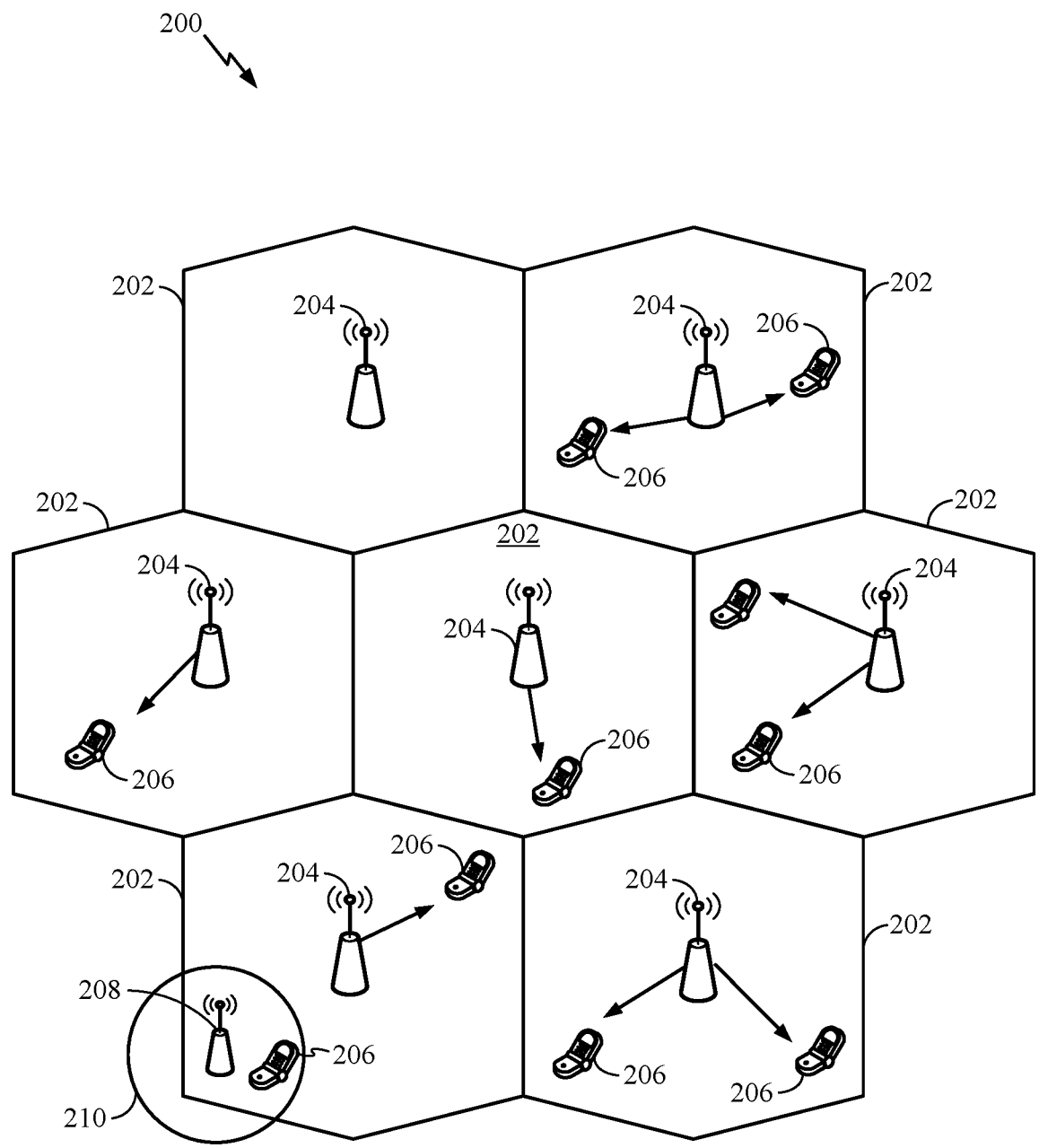
FIG. 2 is a diagram illustrating an example of an access network, in accordance with certain aspects of the disclosure.

FIG. 2 is a diagram illustrating an example of an access network 200 in an LTE network architecture, in accordance with aspects of the present disclosure. eNBs 204, 208, and/or UEs 206 may receive information regarding a configuration of at least one mixed interference measurement subframe. The configuration information may specify a pattern for measuring reference signals by the UE 206 and the eNBs 204, 208 within the mixed interference measurement subframe(s). The eNBs 204 and/or 208 and UE 206 may then take action (e.g., measuring reference signals according to the pattern) to determine interference between nodes in the network 200.

In FIG. 2, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the evolved packet core (EPC), which may include S-GW 124, MME 126, and other entities, for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 124.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
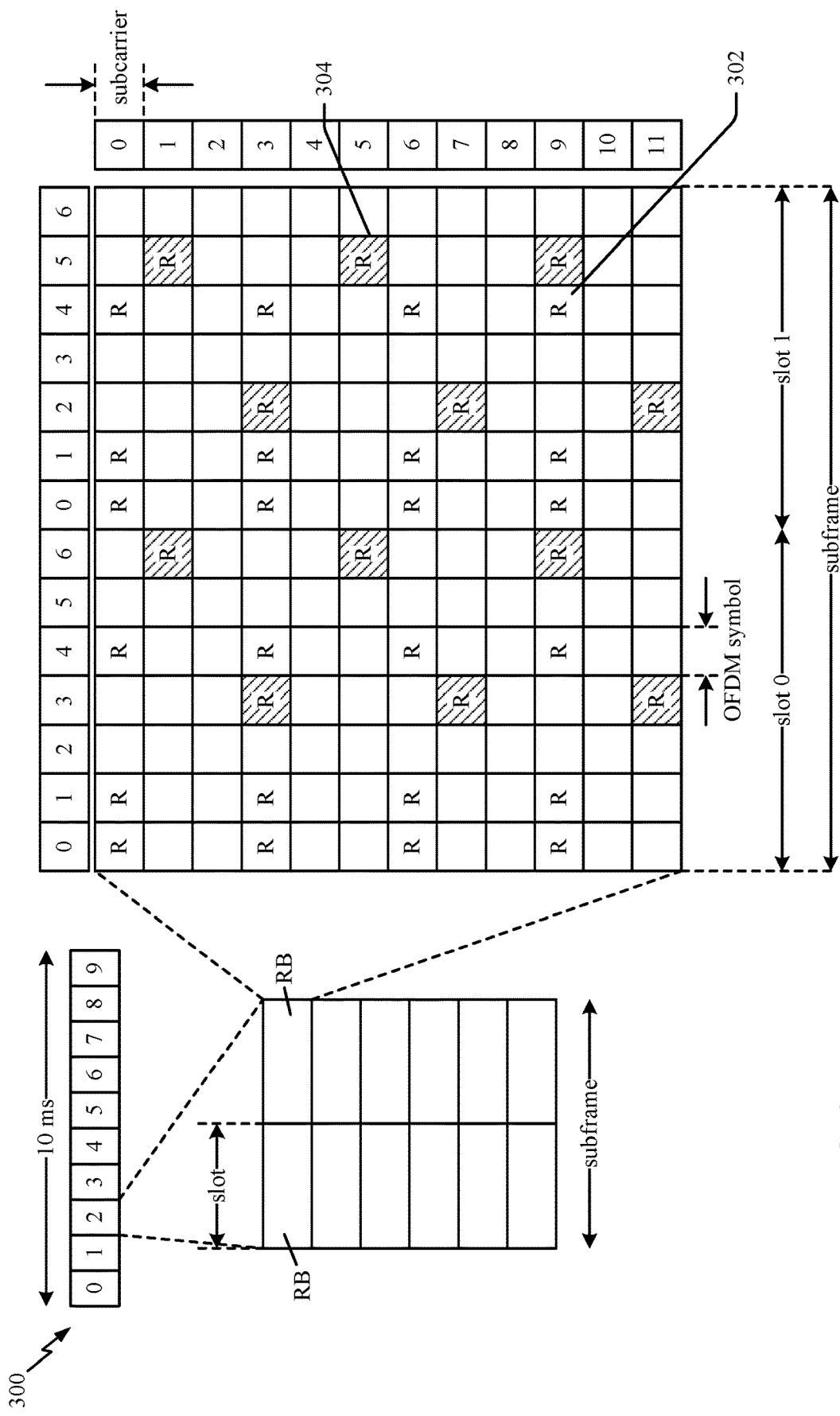
FIG. 3 is a diagram illustrating an example of a DL frame structure in LTE, in accordance with certain aspects of the disclosure.

FIG. 3 is a diagram 300 illustrating an example of a DL frame structure in LTE. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
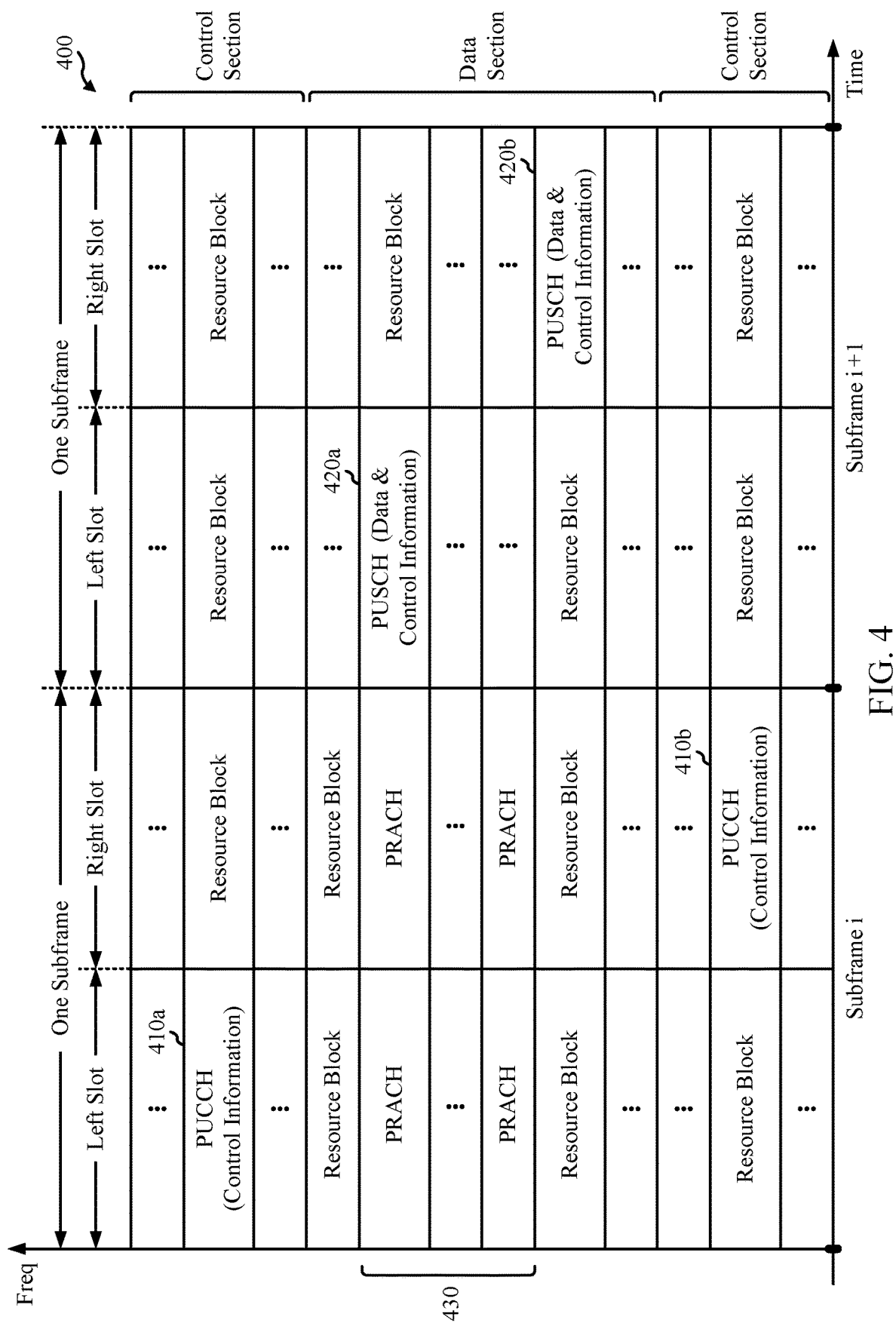
FIG. 4 is a diagram illustrating an example of an UL frame structure in LTE, in accordance with certain aspects of the disclosure.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
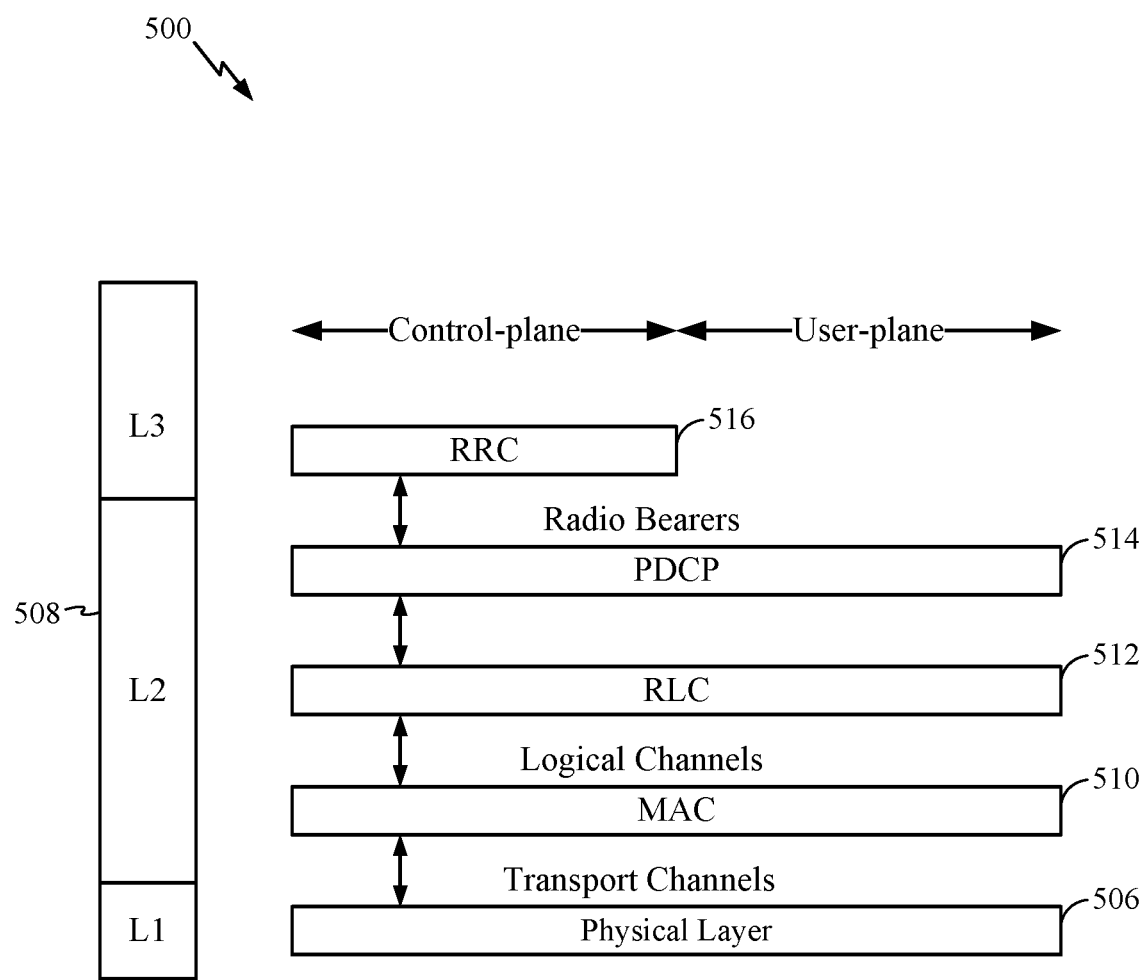
FIG. 5 is a diagram illustrating an example of a radio protocol architecture for the user and control plane, in accordance with certain aspects of the disclosure.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
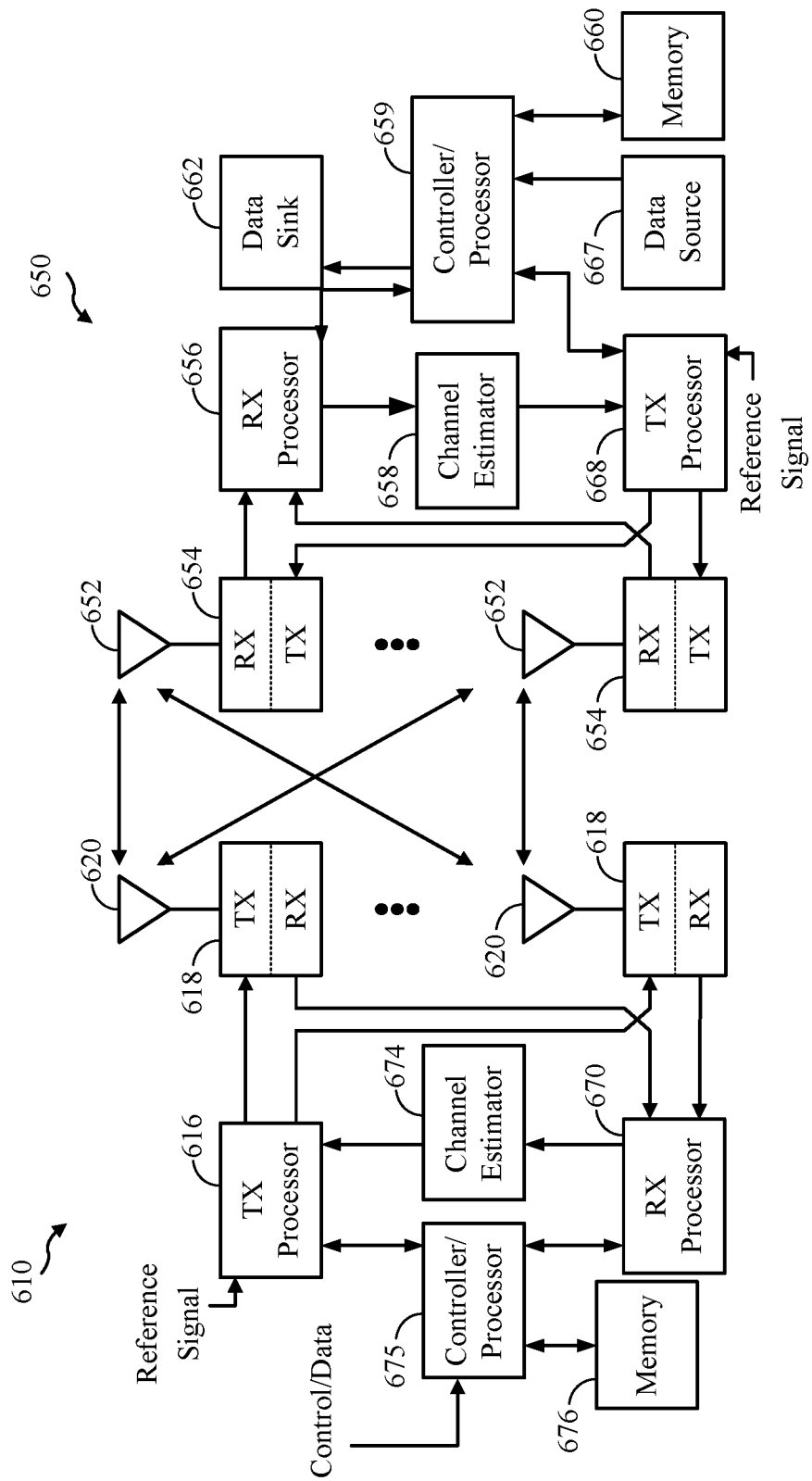
FIG. 6 is a diagram illustrating an example of an evolved Node B (eNB) and user equipment (UE) in an access network, in accordance with certain aspects of the disclosure.

FIG. 6 is a block diagram of an eNB 610 in communication with a UE 650 in an access network, in accordance with aspects of the present disclosure. The base stations 122, 132 and 204 of FIG. 1 and FIG. 2 may include one or more components of eNB 610 illustrated in FIG. 6. Similarly, the UEs 110 and 206 illustrated in FIGS. 1 and 2 may include one or more components of UE 650 illustrated in FIG. 6. As described herein, nodes (e.g., such as BSs, UEs, etc.) in a network may receive information regarding the configuration of mixed interference measurement subframes. Based on the configuration information, the nodes may transmit and/or receive reference signals during the mixed interference measurement subframes and determine interference between the nodes and respective other nodes, based on the reference signals.

For example, the UE 650 may use the configuration information to determine the manner in which it will transmit and/or measure reference signals during the mixed interference measurement subframe, and determine interference between the UE 650 and other UEs, based on the measured reference signals. Similarly, the eNB 610 may use the configuration information to determine the manner in which it will transmit and/or measure reference signals during the mixed interference measurement subframe, and determine interference between the eNB 610 and other eNBs, based on the measured reference signals.

In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor 659 can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

The controller/processor 659 may direct the operation at the UE 650. For example, the controller/processor 659, RX processor 656, TX processor 668 and/or other processors, components, and/or modules at the UE 650 may perform or direct operations 1200 illustrated in FIG. 12 and/or other processes or operations performed by the UE as described herein. The controller/processor 675 may direct the operations at the eNB 610. For example, the controller/processor 675, TX processor 616, RX processor 670 and/or other processors, components, and/or modules at the eNB 610 may perform or direct operations 1100 illustrated in FIG. 11 and/or other processes or operations performed by the eNB as described herein.

Example DL Vs. UL Scheduling

Figure 7:
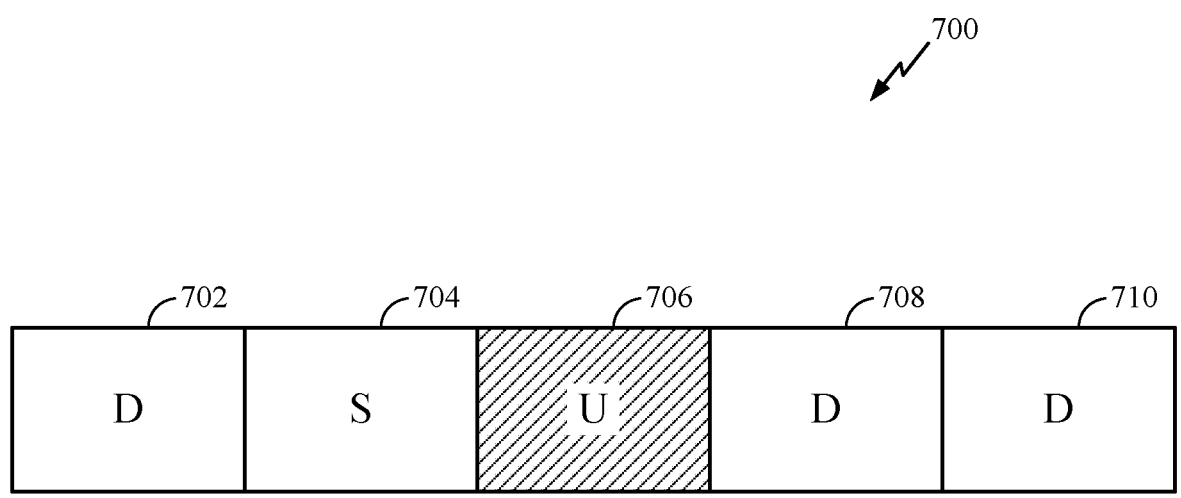
FIG. 7 illustrates an example subframe configuration, in accordance with certain aspects of the disclosure.

FIG. 7 illustrates an example downlink (DL) and uplink (UL) scheduling configuration 700 that may be configured for a network (e.g., LTE). Traditional DL and UL scheduling is generally implemented with a fixed configuration of DL and UL subframes. This enables synchronization across an entire system deployment. For example, at any given point in time, all of the cells in the network are assigned for downlink communication or uplink communication. Referring to the LTE TDD scheduling configuration 700 as a reference example, a network may be configured for downlink transmission on a first subframe 702, fourth subframe 708 and fifth subframe 710, uplink transmission on a third subframe 706, and special subframe configuration (e.g., downlink pilot time slot (DwPTS), uplink pilot time slot (UpPTS), or guard period (GP)) on the second subframe 704.

Due to the fixed DL and UL configuration, interference may be limited to DL-to-DL and/or UL-to-UL interference scenarios. Put differently, a DL transmission of one cell may interfere with a DL transmission of another cell. Similarly, a UL transmission from a UE may interfere with another UL transmission from another UE. In some cases, this DL-to-DL or UL-to-UL interference may be mitigated by a UE associating with a cell (e.g., such as a serving cell) based on the strongest downlink signal, e.g., in a small-cell deployment where a network comprises cells of different power classes, or a UE associating with a strong macro cell. In some cases, eNBs and UEs may use enhanced inter-cell interference coordination (eICIC) and advanced receivers for inter-cell interference management (e.g., in DL Heterogeneous Network (HetNet)) in order to mitigate the interference scenarios. In some cases, power control/shaping may be used in CDMA DL/UL, and SC/O-FDM UL in order to mitigate the interference scenarios. In some cases, intra-cell orthogonalization of multiple DL/UL transmissions within a cell may be used for OFDM DL/SCFDM UL in an effort to mitigate the DL-to-DL and/or UL-to-UL interference.

In general, however, any combination of one or more of the above techniques may be used to mitigate the DL-to-DL and/or UL-to-UL interference. These techniques, however, may not be able to mitigate interference experienced by nodes (e.g., eNBs, UEs) due to mixed interference, such as UL-to-DL interference and DL-to-UL interference.

In certain scenarios, the DL/UL traffic load may not align with the fixed subframe configuration. When a cell has a temporary overload in either the UL or DL, it may be desirable to reconfigure one or more subframes from DL to UL or from UL to DL. For example, when the cell is overloaded in the UL direction, the cell may benefit from reconfiguring a nominally DL subframe for UL transmission. Additionally, when the DL load is high, the perceived DL throughput may be low, even though UL resources may be under-utilized.

The reconfiguration of subframes may cause cells within a network to be unsynchronized, thereby introducing additional interference scenarios. The interference may include DL-to-DL and UL-to-UL scenarios described above as well as "mixed interference" including DL-to-UL and UL-to-DL interference.

An example of UL-to-DL interference may occur when two cell-edge UEs with different serving BSs are arbitrarily close to each other. In this scenario, an UL transmission by a first UE may interfere with the DL transmission intended for a second UE. This may cause severe jamming due to the DL-UL mismatch at the two UEs.

An example of DL-to-UL interference may occur when a second, adjacent, BS's DL transmission is much stronger than a first BS's desired UL signals from its serving UE. In this scenario, the first, receiving BS may experience a degradation in sensitivity to the adjacent BS's DL transmission.

Mixed interference may be particularly serious when the interference is between co-channel or adjacent channel deployments associated with different operators because there may be limited or no dynamic coordination.

According to certain aspects, BSs and/or UEs may construct jamming graphs to account for the UL/DL and/or DL/UL mixed interference scenarios. A node (e.g., BS or UE) may use the jamming graph to determine or learn which other nodes may cause interference to the node as well as the transmit power of each of the other nodes. Based, at least in part, on this information, the node may determine if it may be able to overcome the interference and evaluate the impact of a decision to convert the direction of a nominally downlink subframe to uplink or vice versa.

According to certain aspects, a BS-to-BS jamming graph and a UE-to-UE jamming graph may be constructed. Each vertex in a BS-to-BS jamming graph may represent a BS. Such a BS may be a near-by BS which may cause interference to the BS maintaining the jamming graph. Referring to one reference implementation of a jamming graph, BSi may be connected to BSj in the jamming graph if the maximum interference over thermal (Max_IoT) at BSj due to BSi is greater than the tolerable IoT of BSj (e.g., Max_IoT at BSj due to BSi>BS_Tolerable_IoT of BSj). The edge from BSi to BSj may be labeled as the transmit (Tx) power/effective isotropic radiated power (EIRP)-backoff needed at BSi to ensure that the IoT at BSj due to BSi becomes equal to the BS_Tolerable_IoT of BSj.

Referring to one reference implementation of a UE-to-UE jamming graph, each vertex in the UE-to-UE jamming graph may represent a UE. UEi may be connected to UEj in the jamming graph if the maximum IoT at UEj due to UEi is greater than the tolerable IoT of UEj (e.g., Max_IoT at UEj due to UEi>UE_Tolerable_IoT of UEj). The edge from UEi to UEj may be labeled as the Tx power/EIPR-backoff needed at UEi to ensure that the IoT at UEj due to UEi becomes equal to the UE_Tolerable_IoT of UEj. According to aspects, the IoT computation for the BS-to-BS jamming graph and UE-to-UE jamming graph may also take into account MIMO beamforming (e.g., the direction of a transmission), receiver nulling, and elevation angular separation. In some cases, the BS and/or UE may construct the UE-to-UE jamming graph.

Reference Signals for Estimating Mixed Interference

As mentioned above, in order to determine whether switching a UL subframe to DL or vice versa is beneficial, a BS may benefit from information regarding the mixed interference profile among nodes (e.g., BSs and UEs) in the network. Thus, in some cases, the BS may benefit from knowing the BS-to-BS mixed interference as well as UE-to-UE mixed interference. Traditionally, nodes (e.g., BSs and UEs) in the network use reference signals to estimate the channel from BS-to-UE and UE-to-BS. While using reference signals in this manner may be sufficient for synchronized transmission schemes (e.g., all BSs transmitting in DL or all BSs receiving in uplink, as illustrated in FIG. 7), these reference signals do not allow nodes to infer the mixed interference profile (e.g., DL-to-UL interference and UL-to-DL interference) for respective nodes (e.g., such as for BS-to-BS or UE-to-UE).

As mentioned above, UEs and/or BSs may use knowledge of the mixed interference profile(s) to construct jamming graphs (e.g., such as UE-to-UE jamming graphs, BS-to-BS jamming graphs, etc.). Accordingly, it may be desirable to have new reference signals and/or frame structures that allow nodes to discover mixed interference profiles.

As mentioned above, aspects presented herein provide techniques that allow BSs and UEs to estimate the BS-to-BS and UE-to-UE mixed interference profiles, respectively. Techniques presented herein provide frame structures with one or more subframes that can be used for measuring mixed interference.

Figure 8:
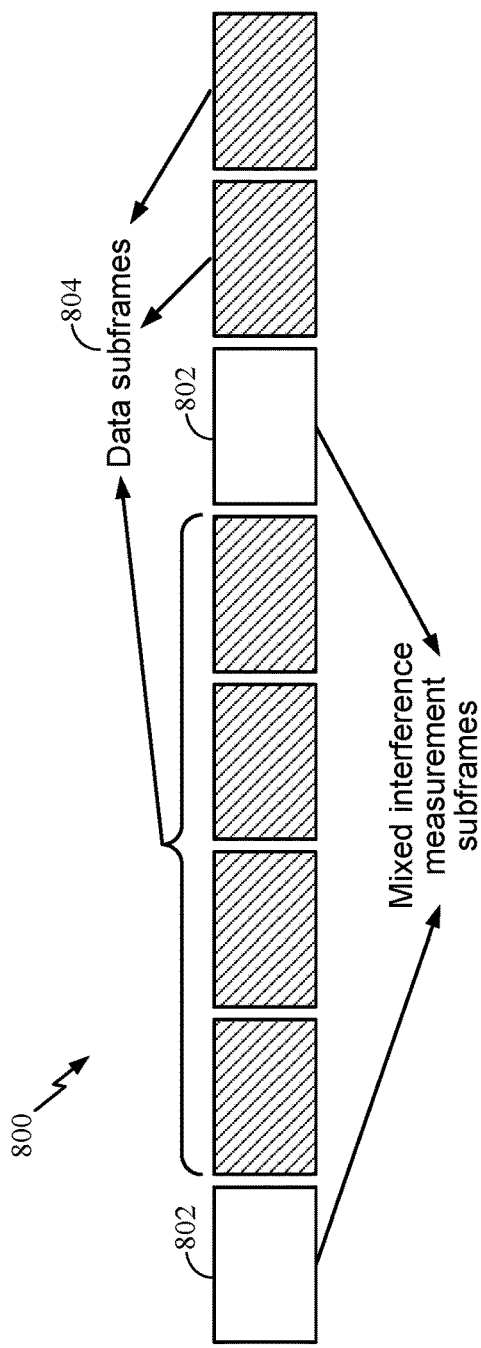
FIG. 8 illustrates an example frame structure that includes mixed interference measurement subframes, in accordance with certain aspects of the present disclosure.

FIG. 8 illustrates an example frame structure 800 that can be used to measure mixed interference, in accordance with certain aspects. As shown, within frame structure 800, mixed interference measurement subframes 802 are used intermittently (e.g., in between data subframes 804). A node (e.g., BS 122, 132, 204 and/or UE 110, 206) may use the measurement subframes 802 to estimate mixed interference. Using the BS as an example node, the BS may use its network listen functionality (e.g., turning on its receiver) to estimate BS-BS channel during the mixed interference measurement subframe(s) 802. Each BS may have a low duty cycle silencing schedule (e.g., from hundreds of milliseconds to a few seconds). The signal-strength from each neighboring BS may be measured during these silent periods. Using the UE 206 as an example node, a subset of UEs may transmit reference signals (e.g., such as sounding reference signals (SRSs), while other UEs measure the reference signals. Such a configuration may result in different SRS signals being multiplexed over multiple "SRS" channels within a given mixed interference measurement subframe 802. Once the node(s) (e.g., BS or UE) estimate mixed interference, the node(s) can compute (or update) a corresponding jamming graph. For example, pairs of UEs with an edge between them may take turns (e.g., on an order of tens of milliseconds) to transmit/receive each other's SRS.

Figure 8A:
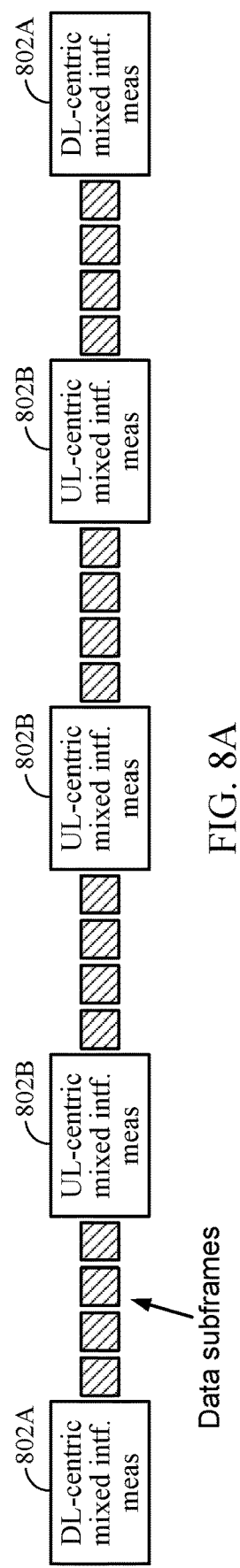
FIG. 8A illustrates an example of the periodicity of mixed interference measurement subframes, in accordance with certain aspects of the present disclosure.

The pattern and/or periodicity (e.g., times of occurrence) of the measurement subframes 802 may be determined by the network scheduler and conveyed to BSs and/or UEs through control signaling. In some cases, DL-centric mixed interference measurement subframes (e.g., used for measuring BS-BS mixed interference) may have a different periodicity than UL-centric mixed interference measurement subframes (e.g., used for measuring UE-UE mixed interference). FIG. 8A illustrates one example of the different periodicity between DL-centric mixed interference measurement subframes 802A and UL-centric mixed interference measurement subframes 802B. As shown, DL-centric measurements may occur with a low duty cycle (e.g., in the range of a few hundred milliseconds to a few seconds), based on the mobility of the base station and/or channel characteristics. For example, a low duty cycle may be used (compared to UL-centric measurements) since base stations may be stationary, the channel profile among them may change slowly, etc. On the other hand, as shown, UL-centric measurements may occur more frequently (e.g., every few tens of milliseconds), based on mobility of UE(s). Using a higher frequency for UL-centric measurements may account for the higher mobility of UEs.

Figure 9:
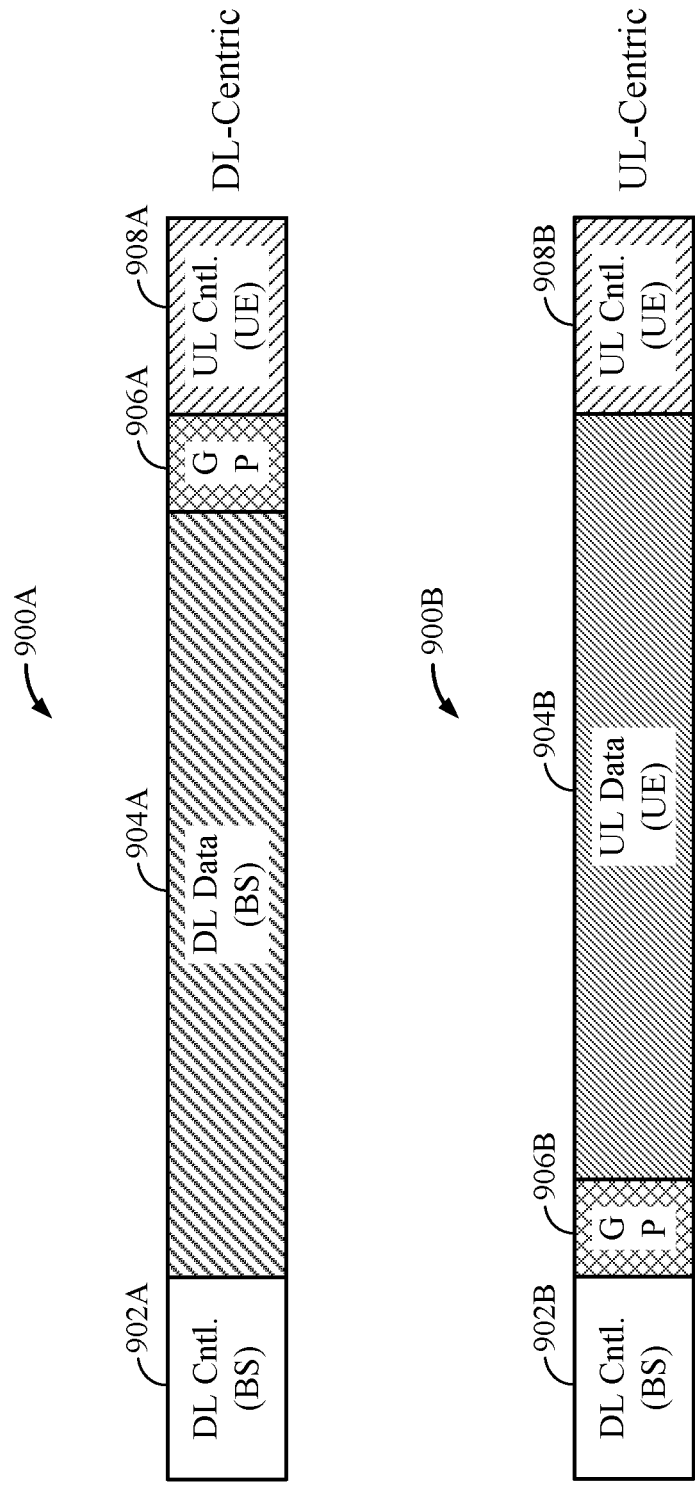
FIG. 9 illustrates an example configuration of DL and UL data subframes, in accordance with certain aspects of the present disclosure.

FIG. 9 illustrates an example structure of normal (self-contained) traffic subframes, which include a DL-centric data subframe 900A and a UL-centric data subframe 900B, according to aspects of the present disclosure. In some embodiments, DL-centric data subframe 900A and UL-centric data subframe 900B are examples of the data subframes 804 illustrated in FIG. 8. As shown, DL-centric data subframe 900A includes a downlink control portion 902A, a downlink data 904A, a guard period (GP) 906A and an uplink control portion 908A. UL-centric data subframe 900B includes a downlink control portion 902B, a guard period 906B, uplink data 904B, and an uplink control portion 908B.

Figure 10:
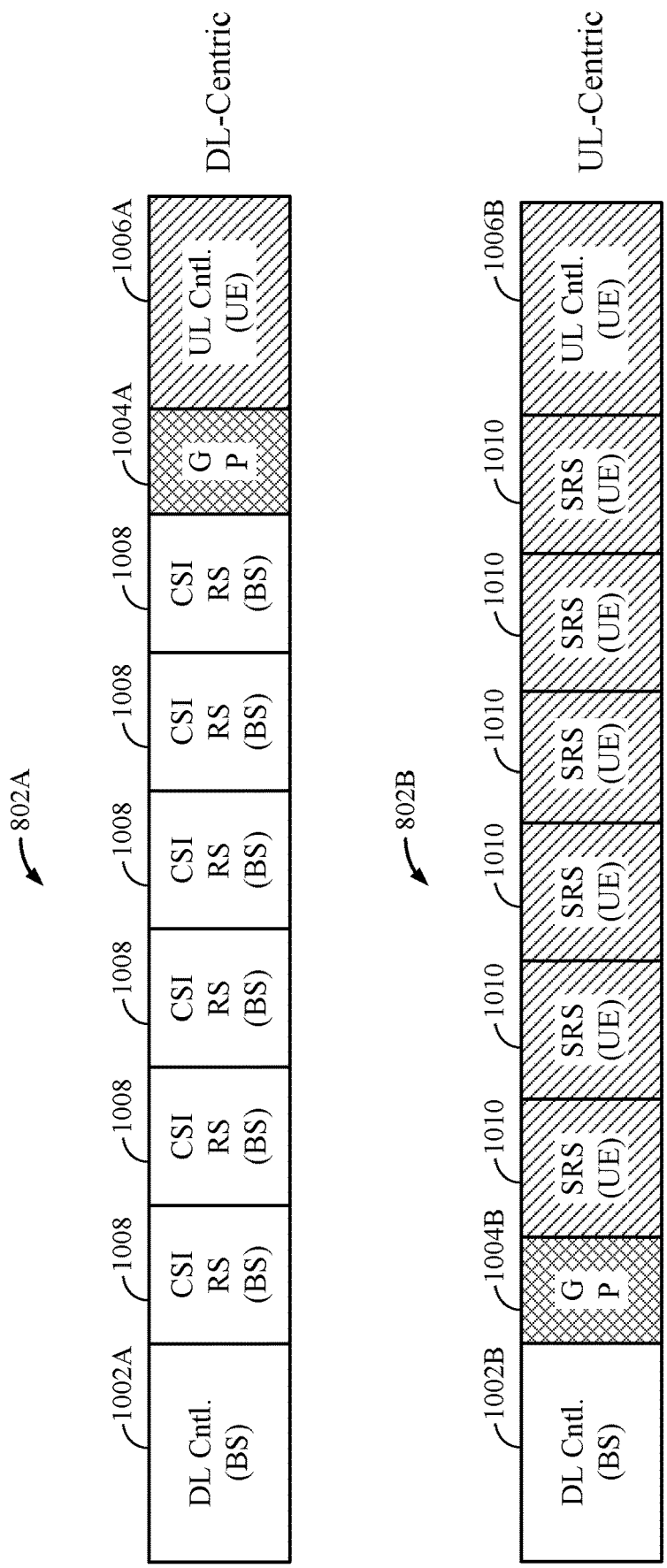
FIG. 10 illustrates an example configuration of DL-centric and UL-centric mixed interference measurement subframes, in accordance with certain aspects of the present disclosure.

FIG. 10 illustrates an example structure of subframes, such as a DL-centric mixed interference measurement subframe 802A and a UL-centric mixed interference measurement subframe 802B that may be used to measure mixed interference, according to aspects of the present disclosure. In one embodiment, the mixed interference measurement subframes 802A and 802B both occur with a low duty cycle, e.g., as compared to data traffic subframes 902 and 904. In one embodiment, the mixed interference measurement subframes 802A and 802B are synchronized across the network.

As shown, similar to the DL-centric data subframe 900A, DL-centric mixed measurement subframe 802A includes a downlink control portion 1002A, a guard period 1004A, and an uplink control portion 1006A. However, instead of or in addition to a downlink data portion, DL-centric mixed interference measurement subframe 802A includes a plurality of slots 1008 for transmitting/receiving channel state information reference signals (CSI-RS) to/from BSs. For example, as described in more detail below, during a DL-centric mixed interference measurement subframe 802A, each BS may transmit on a subset of the CSI-RS slots 1008, and listen on the remaining CSI-RS slots 1008 (e.g., except during a Tx-Rx switch). Although not shown, in general, a mixed interference measurement subframe (e.g., subframe 802A) may also carry some data portion in addition to one or more slots 1008 for CSI-RS.

UL-centric measurement subframe 802B, similar to UL-centric data subframe 900B, includes a downlink control portion 1002B, a guard period 1004B and an uplink control portion 1006B. However, instead of or in addition to an uplink data portion, UL-centric mixed interference measurement subframe 802B includes a plurality of slots 1010 for transmitting/receiving sounding reference signals (SRSs) to/from UEs. For example, as also described in more detail below, during a UL-centric mixed interference measurement subframe 802B, each UE may transmit on a subset of the SRS slots 1010, and listen on the remaining SRS slots 1010 (e.g., except during a Tx-Rx switch). Although not shown, in general, a mixed interference measurement subframe (e.g., subframe 802B) may also carry a data portion in addition to one or more slots 1010 for SRS.

Figure 11:
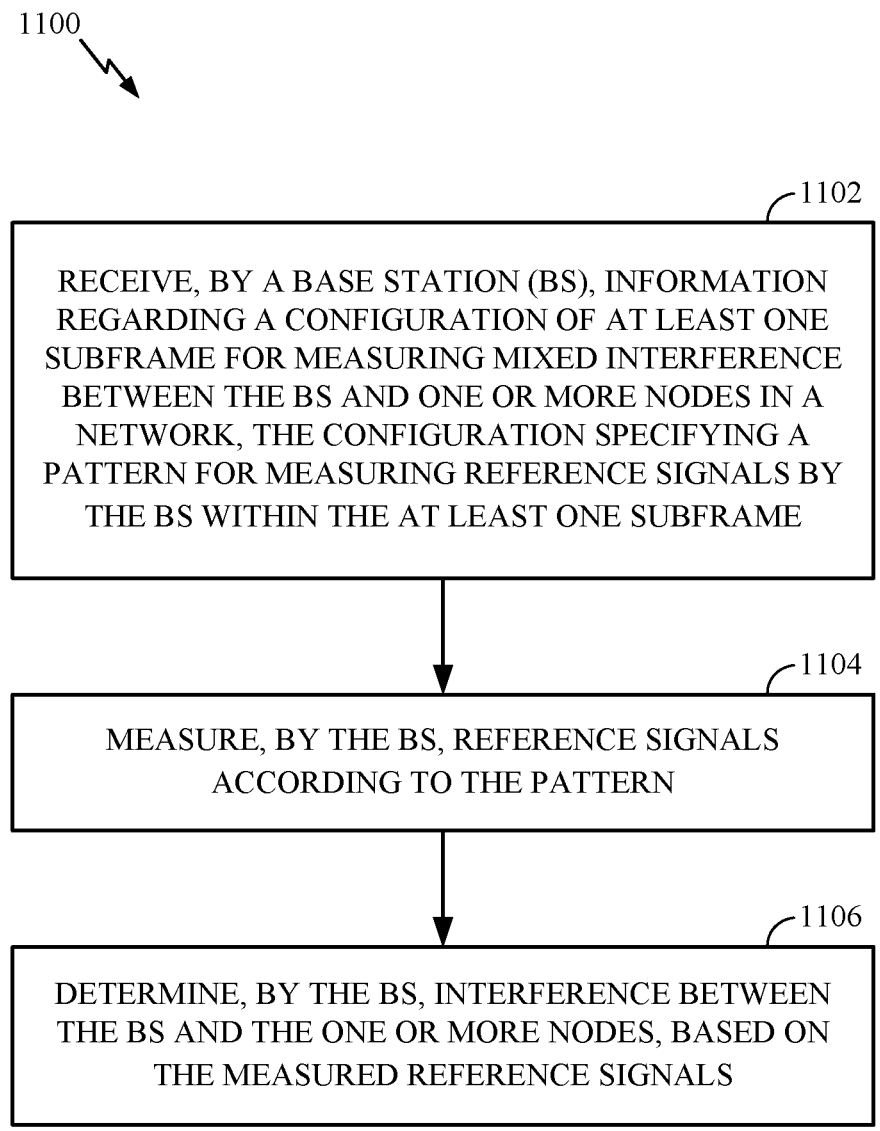
FIG. 11 illustrates example operations that may be performed by a base station, in accordance with certain aspects of the present disclosure.

FIG. 11 illustrates example operations 1100 which may be performed by a BS, according to aspects of the present disclosure. For example, BS 122, 132 of FIG. 1 and/or BS 204, 208 of FIG. 2, which may include one or more components and/or modules of BS 610 of FIG. 6 may perform the operations 1100. According to aspects, the controller/processor 675, memory 676, and/or Tx/Rx 618 may perform aspects described herein.

At 1102, the BS receives information regarding a configuration of at least one subframe for measuring mixed interference between the BS and one or more nodes (e.g., such as one or more other BSs) in a network. The configuration information may specify a pattern for measuring reference signals by the BS within the at least one subframe. At 1104, the BS measures reference signals according to the pattern. At 1106, the BS determines interference between the BS and the one or more nodes, based on the measured reference signals.

Figure 12:
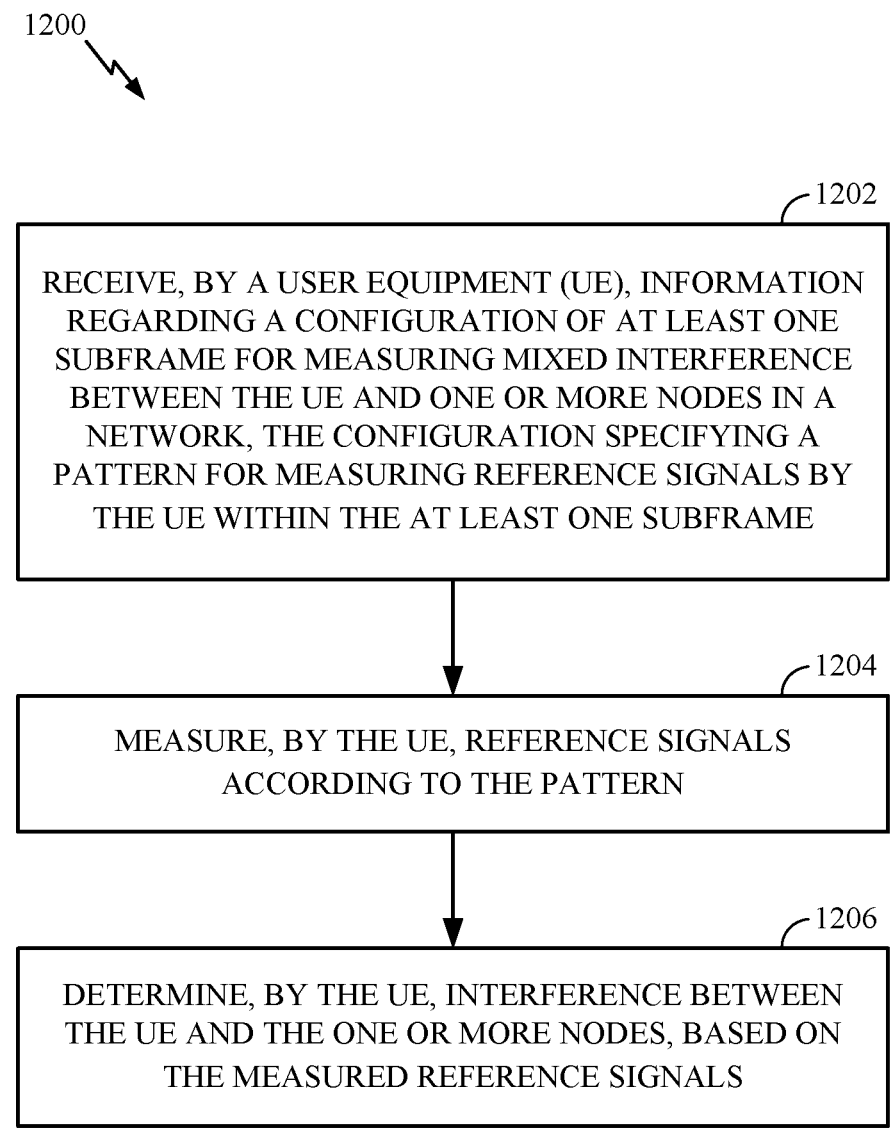
FIG. 12 illustrates example operations that may be performed by a user equipment, in accordance with certain aspects of the present disclosure.

FIG. 12 illustrates example operations 1200 which may be performed by a UE, according to aspects of the present disclosure. For example, UE 110 of FIG. 1 and/or UE 206 of FIG. 2, which may include one or more components and/or modules of UE 650 of FIG. 6 may perform the operations 1200. According to aspects, the controller/processor 658, memory 660, and/or Tx/Rx 654 may perform aspects described herein.

At 1202, the UE receives information regarding a configuration of at least one subframe for measuring mixed interference between the UE and one or more nodes (e.g., such as one or more other UEs) in a network. The configuration information may specify a pattern for measuring reference signals by the UE within the at least one subframe. At 1204, the UE measures reference signals according to the pattern. At 1206, the UE determines interference between the UE and the one or more nodes, based on the measured reference signals.

According to certain aspects, the configuration information may specify a pattern of occurrence of the mixed interference measurement subframes (e.g., such as mixed interference measurement subframes 802A and 802B). Additionally or alternatively, the configuration information may specify the measurement frame structure, for each node, within the mixed interference measurement subframe. Such measurement frame structure may include the transmission and reception pattern for each node to follow within the mixed interference measurement subframe. The configuration information may be determined by a network and conveyed to BSs and/or UEs via control signaling.

Figure 13:
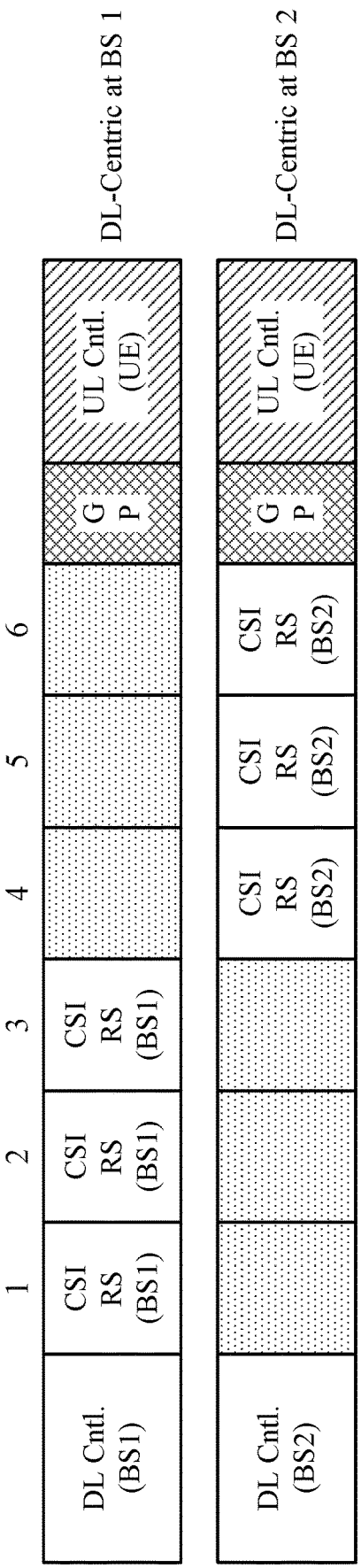
FIG. 13 illustrates an example transmission/reception pattern for BSs in a DL-centric mixed interference measurement subframe, in accordance with certain aspects of the present disclosure.

FIG. 13 illustrates one example of a transmission/reception pattern across different BSs (BS1 and BS2) that may be configured for a DL centric measurement subframe, such as DL measurement subframe 802A. In this particular example, BS1 transmits CSI-RS (e.g., to BS2) in the first 3 slots 1008 (slots 1, 2 and 3) of the DL-centric measurement subframe, and listens for CSI-RS on the remaining 3 slots 1008 (slots 4, 5 and 6). BS2, on the other hand, listens for CSI-RS on the first 3 slots 1008 and transmits CSI-RS (e.g., to BS1) on the remaining 3 slots 1008. In certain aspects, each BS, during the slots designated for transmitting CSI-RS, may transmit CSI-RS to one or more BSs. Likewise, each BS, during the slots designated for receiving CSI-RS, may receive CSI-RS from one or more BSs.

Figure 14:
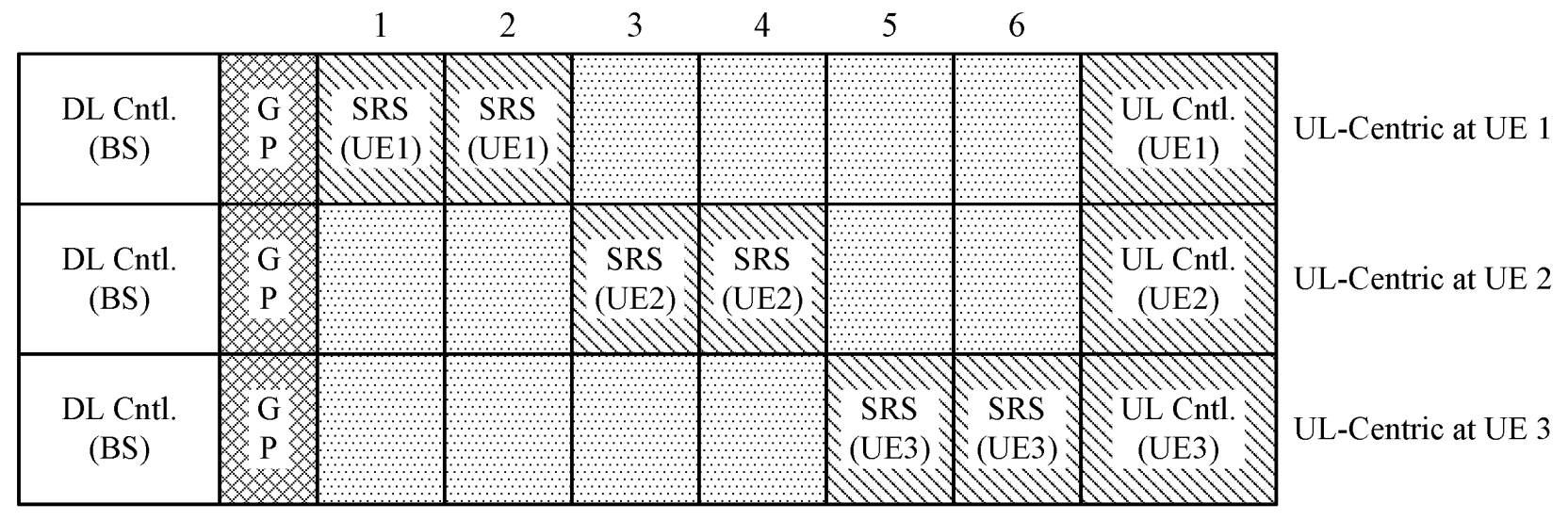

FIG. 14 illustrates an example of a transmission/reception pattern across different UEs (UE1, UE2, and UE3) that may be configured for a UL centric measurement subframe, such as UL measurement subframe 802B. In this particular example, UE1 transmits SRS in the first two slots 1010 (e.g., slots 1 and 2) of the UL centric mixed interference measurement subframe and listens for SRS in the remaining slots 1010 (slots 3, 4, 5 and 6) of the UL centric mixed interference measurement subframe 802B. UE2 transmits SRS in the next two slots 1010 (e.g., slots 3 and 4) of the UL centric mixed interference measurement subframe 802B and listens for SRS in the remaining slots 1010 (e.g., slots 1, 2, 5 and 6) of the UL centric mixed interference measurement subframe 802B. Lastly, UE3 transmits SRS in the last two slots 1010 (e.g., slots 5 and 6) of the UL centric mixed interference measurement subframe 802B and listens for SRS in the remaining slots 1010 (e.g., slots 1, 2, 3 and 4) of the UL centric mixed interference measurement subframe 802B. In certain aspects, each UE may transmit SRS to one or more UEs during their respective slots 1010 designated for transmitting SRS. Likewise, each UE may receive SRS from one or more UEs during their respective slots 1010 designated for receiving SRS. In certain aspects, the configuration information for UL centric mixed interference measurement subframes may be determined by the BS and signaled to the UE(s) via control signaling, e.g., such as radio resource control (RRC) signaling.

Additionally or alternatively, according to certain aspects, the configuration information may also specify, within the transmission/reception pattern, at least one set of frequency resources each node is to use for transmitting/receiving reference signals during the mixed interference measurement subframes 802A, 802B.

Figure 15:
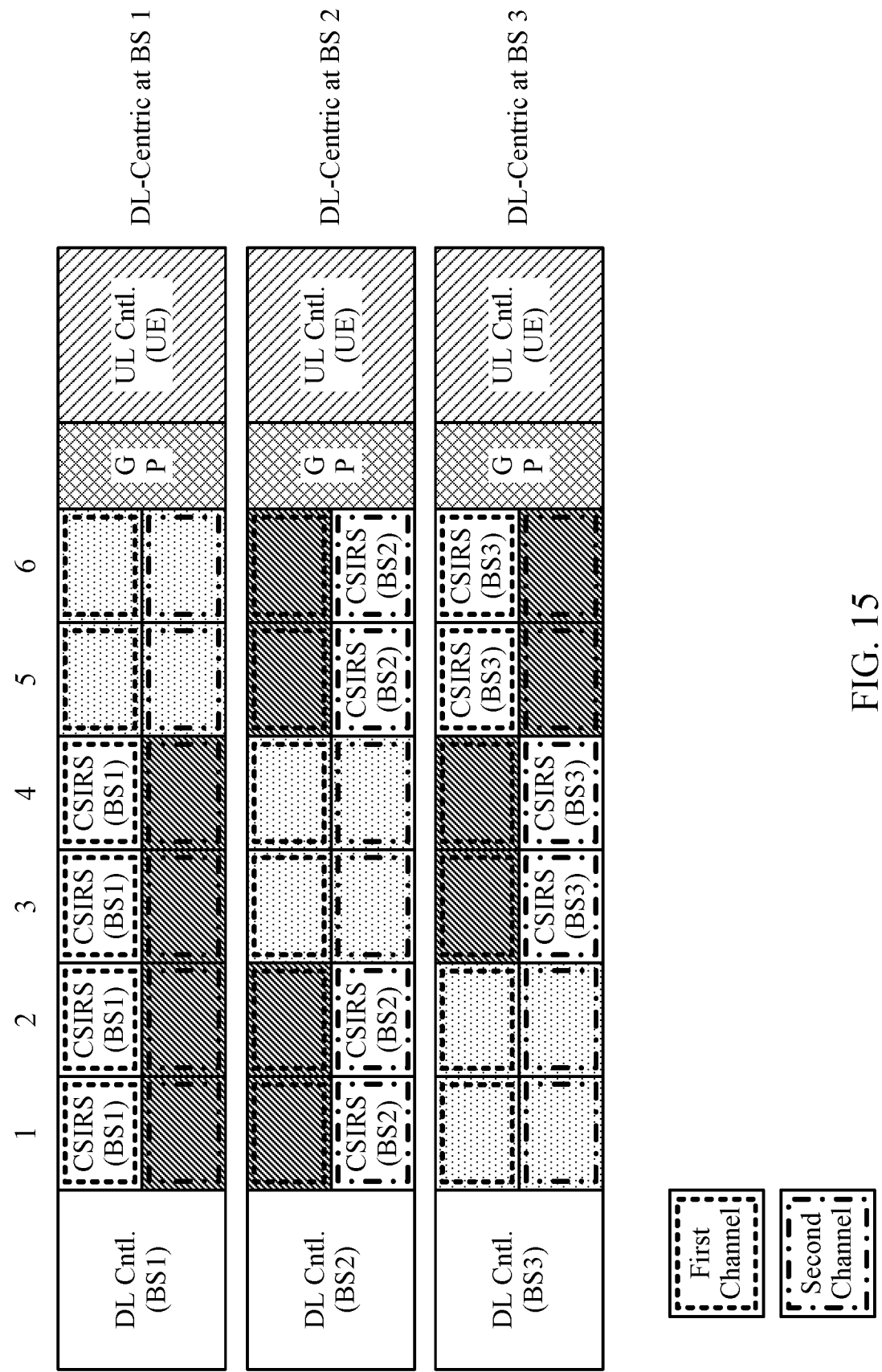
FIG. 15 illustrates another example transmission/reception pattern for BSs in a DL-centric mixed interference measurement subframe, in accordance with certain aspects of the present disclosure.
Figure 16:
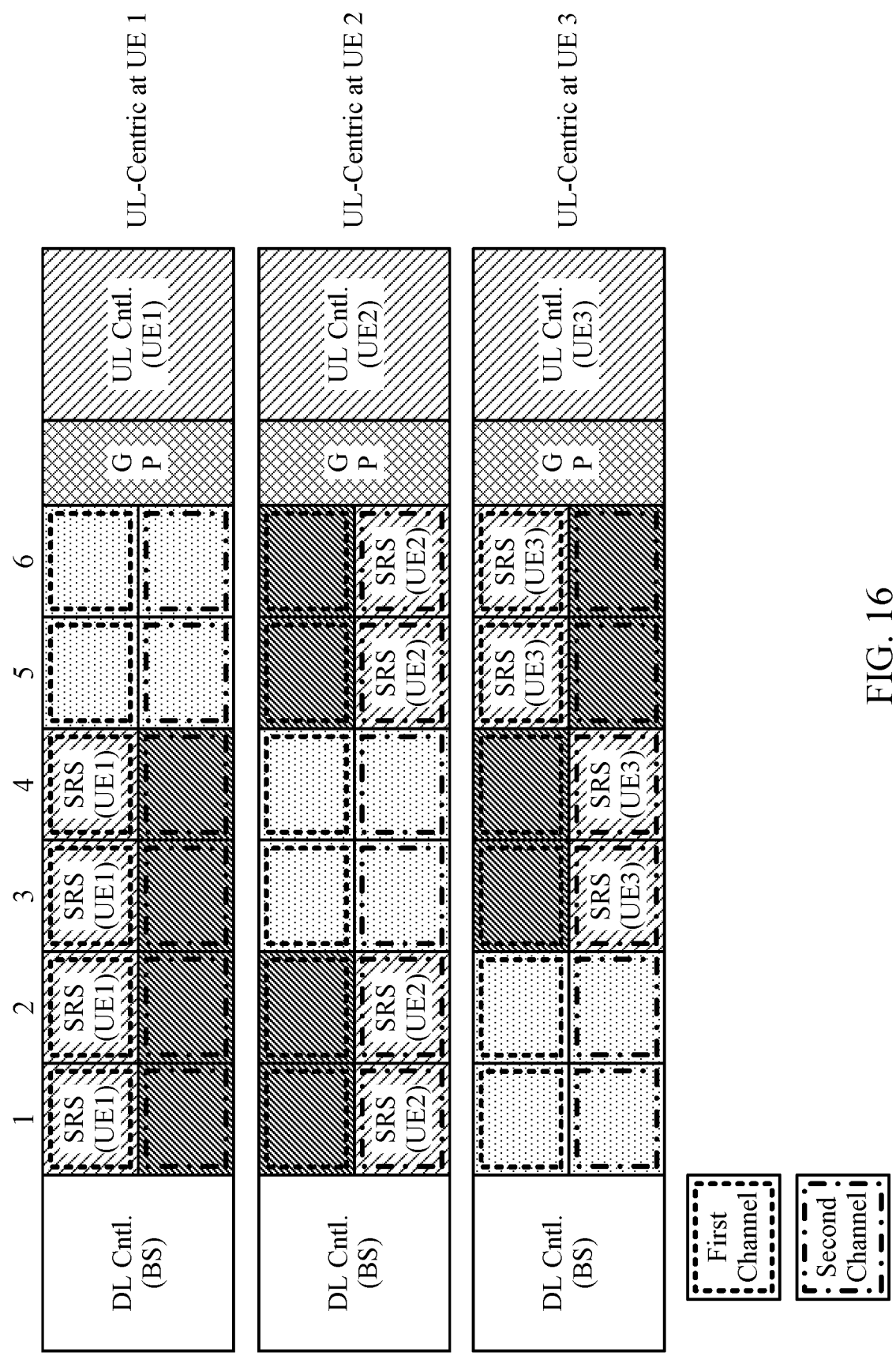
FIG. 16 illustrates another example transmission/reception pattern for UEs in a UL-centric mixed interference measurement subframe, in accordance with certain aspects of the present disclosure.

FIGS. 15 and 16 illustrate an example of a configuration of a DL centric mixed interference measurement subframe and UL centric mixed interference measurement subframe that specifies different frequency resources for transmitting/receiving reference signals, according to aspects of the present disclosure.

As shown in FIG. 15, different BSs may use different frequency resources (e.g., a first channel or a second channel) to send CSI-RS at the same time. For example, during the first two time slots 1008 (slots 1 and 2), BS1 transmits CSI-RS on the first channel and BS2 transmits CSI-RS on the second channel, while BS3 listens for CSI-RS on both channels. During the second two time slots 1008 (slots 3 and 4), BS1 transmits CSI-RS on the first channel and BS3 transmits CSI-RS on the second channel, while BS2 listens for CSI-RS on both channels. During the last two time slots (slots 5 and 6) 1008, BS3 transmits CSI-RS on the first channel and BS2 transmits CSI-RS on the second channel, while BS1 listens for CSI-RS on both channels. In this manner, a set of BSs can transmit CSI-RS in parallel while the other set listens for CSI-RS.

As shown in FIG. 16, different UEs may also use different frequency resources (e.g., a first channel or a second channel) to send SRS at the same time. For example, during the first two time slots 1010 (slots 1 and 2), UE1 transmits SRS on the first channel and UE2 transmits SRS on the second channel, while UE3 listens for SRS on both channels. During the second two time slots 1010 (slots 3 and 4), UE1 transmits SRS on the first channel and UE3 transmits SRS on the second channel, while UE2 listens for SRS on both channels. During the last two time slots 1010 (slots 5 and 6), UE3 transmits SRS on the first channel and UE2 transmits SRS on the second channel, while UE1 listens for SRS on both channels. In this manner, a set of UEs can transmit SRS in parallel while the other set listens for SRS.

In certain aspects, the pattern of which UEs transmit reference signals and which UEs listen (or measure) reference signals may depend on whether UEs are served by the same or different base stations. For example, in some cases, UE-to-UE interference may be present when two or more UEs are under different serving base stations, but may not be present when two or more UEs are served by the same base station (e.g., in many cases, the UL-DL subframe configuration can be the same for all UEs within a same cell). Thus, in some embodiments, when UEs are served by the same base station, these UEs may be grouped to transmit together (e.g., possibly using different frequency resources) and grouped to listen (or measure) together.

In certain aspects, a mobility event of one or more UEs may trigger the occurrence of a mixed interference measurement subframe and/or a change in configuration (e.g., the transmission/reception pattern of the UEs) of the mixed interference measurement subframe. For example, if two UEs are initially served by the same base station, these UEs may be grouped to transmit and/or receive together, as described above. However, if a handover of the UE from the above base station to another base station occurs, such an event can trigger a change in the configuration of time slots, frequency resources, periodicity of mixed interference measurement subframes, etc. for transmitting/receiving reference signals for the two UEs.

According to certain aspects, once the nodes (e.g., UEs and BSs) in the network receive the configuration of the mixed interference measurement subframes, the nodes transmit and receive reference signals based on the configuration in order to enable measurement of mixed interference. For example, BSs may follow a pre-configured schedule involving CSI-RS transmission and/or network listening during measurement subframes to learn about BS-to-BS interference profile(s). A subset of UEs can transmit SRS, based on the configuration, while other UEs measure their signals, to learn about UE-to-UE interference profile(s). In this manner, BS-to-BS mixed interference may be measured by each BS and transmitted to other BSs. UE-to-UE mixed interference may be measured by each UE from other UEs and may be reported to a BS, for example a UE's serving BS.

According to certain aspects, the UE-to-UE measurement may operate in isolation (e.g., without enabling BS-to-BS measurement) or vice versa. For example, a BS may send signals to UEs to configure them to do UE-to-UE measurement, but the BS(s) may or may not be configured to perform measurement of BS-to-BS reference signals. Similarly, a network entity may send signals to BS(s) to configure them to do BS-to-BS measurement, but UE(s) may or may not be configured to perform measurement of UE-to-UE reference signals.

In some cases, BSs may exchange their own measurements, as well as the reports received from UEs, to other BSs via backhaul or over the air transmission. Based on this information, each BS may construct the mixed interference profile in the form of the jamming graph as described above. For example, the information can be made available to a scheduler (e.g., at the base station), and the BS may use the information to construct the jamming graph. The jamming graph may be used to evaluate the impact of a decision to convert the direction of a nominally downlink subframe to an uplink subframe or vice versa. Such an approach allows nodes to make scheduling decisions that may minimize the impact of mixed interference in a semi-static manner. Put differently, nodes may not have to negotiate before every slot in order to identify the interference impact of a decision to switch direction of a transmission. Doing so in this manner significantly reduces the overhead associated with performing such a handshake negotiation before every subframe.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually communicating a frame, a device may have an interface to communicate a frame for transmission or reception. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in Figures, those operations may be performed by any suitable corresponding counterpart means-plus-function components.

For example, means for receiving, means for measuring and/or means for monitoring may include a receiver, such as RX processor 670, and/or antenna(s) 620 of TX/RX 618 of the base station 610 illustrated in FIG. 6 and/or RX processor 656, and/or antenna(s) 652 of the RX/TX 654 of the user equipment 650 illustrated in FIG. 6. Means for determining, means for measuring, means monitoring, means for applying, means for selecting, means for constructing, and/or means for performing, may include one or more processors (or a processing system), such as controller/processor 675, TX processor 616 and/or RX processor 670 of the base station 610 illustrated in FIG. 6, and/or controller/processor 659, RX processor 656 and/or TX processor 668 of the user equipment 650 illustrated in FIG. 6. Means for signaling, means for providing, means for transmitting, and/or means for indicating may include a transmitter, such as TX processor 616, and/or antenna(s) 620 of TX/RX 618 of the base station 610 illustrated in FIG. 6, and/or TX processor 668 and/or antenna(s) 652 of RX/TX 654 of the user equipment 650 illustrated in FIG. 6.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof. A software/firmware module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method for wireless communication by a user equipment (UE), comprising:
   receiving information regarding a configuration of at least one subframe for measuring mixed interference between the UE and one or more other UEs in a network, the configuration specifying a first pattern for measuring first reference signals from the one or more other UEs within the at least one subframe and a second pattern for transmitting second reference signals to the one or more other UEs within the at least one subframe, wherein the first pattern for measuring first reference signals indicates at least a first set of time slots within the at least one subframe for receiving the first reference signals and the second pattern for transmitting second reference signals indicates at least a second set of time slots within the at least one subframe for transmitting the second reference signals;
   measuring the first reference signals from the one or more other UEs within the at least one subframe according to the first pattern;
   transmitting the second reference signals to the one or more other UEs within the at least one subframe according to the second pattern, wherein the first reference signals are of a same type as the second reference signals; and
   determining interference between the UE and the one or more other UEs, based on the measured first reference signals.

2. The method of claim 1, wherein the configuration further comprises information regarding times of occurrence of the at least one subframe for measuring the mixed interference between the UE and the one or more other UEs in the network.

3. The method of claim 2, wherein the times of occurrence of the at least one subframe is based on mobility of the UE in the network.

4. The method of claim 3, wherein the at least one subframe is triggered upon a handover of the UE from a first base station to a second base station.

5. The method of claim 1, wherein:
   the first pattern for measuring first reference signals further indicates at least a first set of frequency resources during the first set of time slots within the at least one subframe for receiving the first reference signals; and
   the second pattern for transmitting second reference signals further indicates at least a second set of frequency resources during the second set of time slots within the at least one subframe for transmitting the second reference signals.

6. The method of claim 1, further comprising:
   determining, based on the measured first reference signals, jamming information regarding an interference profile between the UE and each of the one or more other UEs; and constructing a jamming graph based on the jamming information.

7. The method of claim 1, wherein the first reference signals and the second reference signals comprise sounding reference signals (SRSs).

8. The method of claim 1, further comprising determining whether to change a transmission direction of at least another subframe based on the measured first reference signals.

9. An apparatus for wireless communications by a user equipment (UE), comprising:
    means for receiving information regarding a configuration of at least one subframe for measuring mixed interference between the UE and one or more other UEs in a network, the configuration specifying a first pattern for measuring first reference signals from the one or more other UEs within the at least one subframe and a second pattern for transmitting second reference signals to the one or more other UEs within the at least one subframe, wherein the first pattern for measuring first reference signals indicates at least a first set of time slots within the at least one subframe for receiving the first reference signals and the second pattern for transmitting second reference signals indicates at least a second set of time slots within the at least one subframe for transmitting the second reference signals;
    means for measuring the first reference signals from the one or more other UEs within the at least one subframe according to the first pattern;
    means for transmitting the second reference signals to the one or more other UEs within the at least one subframe according to the second pattern, wherein the first reference signals are of a same type as the second reference signals; and
    means for determining interference between the UE and the one or more other UEs, based on the measured first reference signals.

10. The apparatus of claim 9, wherein:
    the first pattern for measuring first reference signals further indicates at least a first set of frequency resources during the first set of time slots within the at least one subframe for receiving the first reference signals; and
    the second pattern for transmitting second reference signals further indicates at least a second set of frequency resources during the second set of time slots within the at least one subframe for transmitting the second reference signals.

11. The apparatus of claim 9, wherein the configuration further comprises information regarding times of occurrence of the at least one subframe for measuring the mixed interference between the UE and the one or more other UEs in the network.

12. The apparatus of claim 11, wherein the times of occurrence of the at least one subframe is based on mobility of the UE in the network.

13. The apparatus of claim 12, wherein the at least one subframe is triggered upon a handover of the UE from a first base station to a second base station.

14. The apparatus of claim 9, further comprising:
    means for determining, based on the measured first reference signals, jamming information regarding an interference profile between the UE and each of the one or more other UEs; and
    means for constructing a jamming graph based on the jamming information.

15. The apparatus of claim 9, wherein the first reference signals and the second reference signals comprise sounding reference signals (SRSs).

16. The apparatus of claim 9, further comprising means for determining whether to change a transmission direction of at least another subframe based on the measured first reference signals.

17. An apparatus for wireless communications by a user equipment (UE), comprising:
    a receiver configured to receive information regarding a configuration of at least one subframe for measuring mixed interference between the UE and one or more other UEs in a network, the configuration specifying a first pattern for measuring first reference signals from the one or more other UEs within the at least one subframe and a second pattern for transmitting second reference signals to the one or more other UEs within the at least one subframe, wherein the first pattern for measuring first reference signals indicates at least a first set of time slots within the at least one subframe for receiving the first reference signals and the second pattern for transmitting second reference signals indicates at least a second set of time slots within the at least one subframe for transmitting the second reference signals;
    a transmitter configured to transmit the second reference signals to the one or more other UEs within the at least one subframe according to the second pattern;
    at least one processor configured to:
        measure the first reference signals from the one or more other UEs within the at least one subframe according to the first pattern, wherein the first reference signals are of a same type as the second reference signals; and
        determine interference between the UE and the one or more other UEs, based on the measured first reference signals; and
    a memory coupled to the at least one processor.

18. The apparatus of claim 17, wherein:
    the first pattern for measuring first reference signals further indicates at least a first set of frequency resources during the first set of time slots within the at least one subframe for receiving the first reference signals; and
    the second pattern for transmitting second reference signals further indicates at least a second set of frequency resources during the second set of time slots within the at least one subframe for transmitting the second reference signals.

19. The apparatus of claim 17, wherein the configuration further comprises information regarding times of occurrence of the at least one subframe for measuring the mixed interference between the UE and the one or more other UEs in the network.

20. The apparatus of claim 19, wherein:
    the times of occurrence of the at least one subframe is based on mobility of the UE in the network; and
    the at least one subframe is triggered upon a handover of the UE from a first base station to a second base station.

21. The apparatus of claim 17, wherein the at least one processor is further configured to determine whether to change a transmission direction of at least another subframe based on the measured first reference signals.

22. A non-transitory computer-readable medium having computer executable code stored thereon for wireless communications by a user equipment (UE), the computer executable code comprising code for:

receiving information regarding a configuration of at least one subframe for measuring mixed interference between the UE and one or more other UEs in a network, the configuration specifying a first pattern for measuring first reference signals from the one or more other UEs within the at least one subframe and a second pattern for transmitting second reference signals to the one or more other UEs within the at least one subframe, wherein the first pattern for measuring first reference signals indicates at least a first set of time slots within the at least one subframe for receiving the first reference signals and the second pattern for transmitting second reference signals indicates at least a second set of time slots within the at least one subframe for transmitting the second reference signals;

measuring the first reference signals from the one or more other UEs within the at least one subframe according to the first pattern;

transmitting the second reference signals to the one or more other UEs within the at least one subframe according to the second pattern; and determining interference between the UE and the one or more other UEs, based on the measured first reference signals.

23. The non-transitory computer-readable medium of claim 22, wherein:

the first pattern for measuring first reference signals further indicates at least a first set of frequency resources during the first set of time slots within the at least one subframe for receiving the first reference signals; and the second pattern for transmitting second reference signals further indicates at least a second set of frequency resources during the second set of time slots within the at least one subframe for transmitting the second reference signals.

24. The non-transitory computer-readable medium of claim 22, wherein the configuration further comprises information regarding times of occurrence of the at least one subframe for measuring the mixed interference between the UE and the one or more other UEs in the network.

25. The non-transitory computer-readable medium of claim 24, wherein:

the times of occurrence of the at least one subframe is based on mobility of the UE in the network; and the at least one subframe is triggered upon a handover of the UE from a first base station to a second base station.

26. The non-transitory computer-readable medium of claim 22, the computer executable code further comprising code for determining whether to change a transmission direction of at least another subframe based on the measured first reference signals.

* * * * *